March 22, 1960     J. N. CALDWELL ET AL     2,929,975
D.C. ADJUSTABLE SPEED DRIVE
Filed May 6, 1959     3 Sheets-Sheet 1
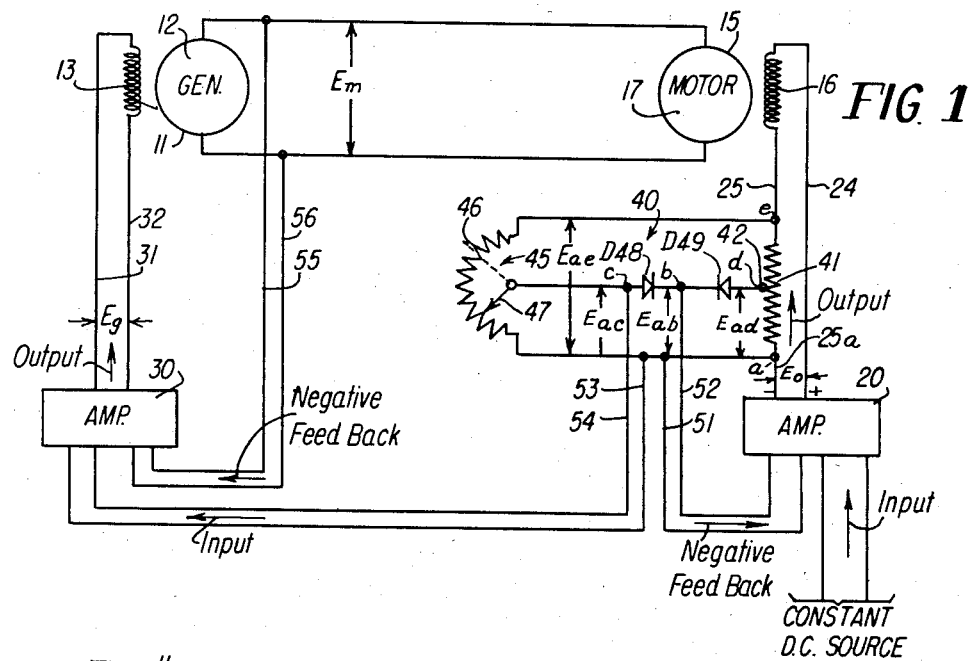
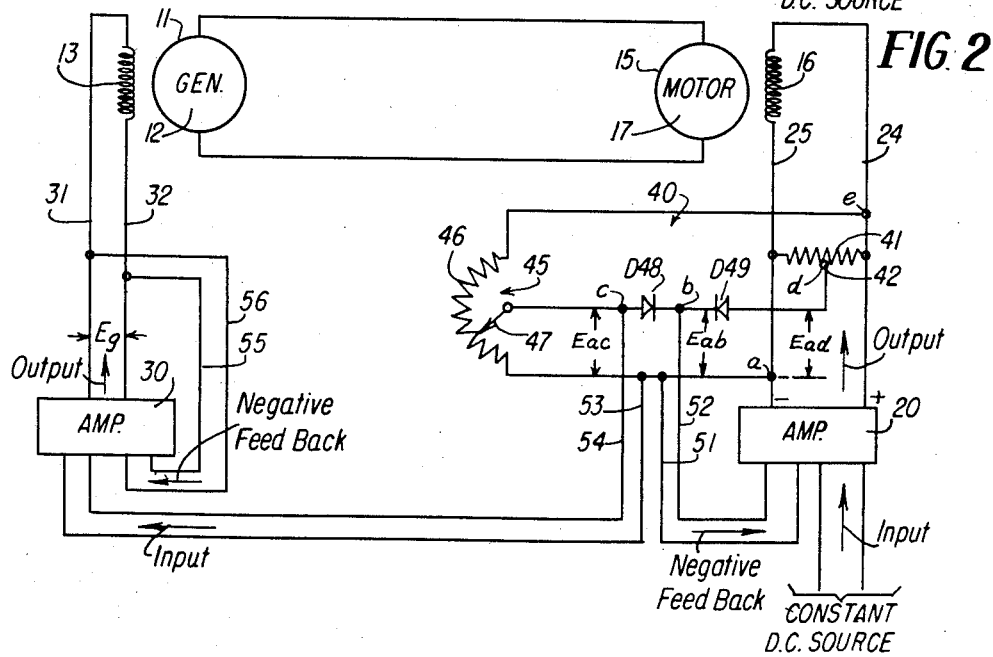
INVENTORS
James N. Caldwell
Hans R. A. Hansen
BY
Attys.

March 22, 1960  J. N. CALDWELL ET AL  2,929,975
D.C. ADJUSTABLE SPEED DRIVE

Filed May 6, 1959  3 Sheets-Sheet 2

INVENTORS
James N. Caldwell
BY  Hans R. A. Hansen

Byron Hume Groen & Clement
Attys.

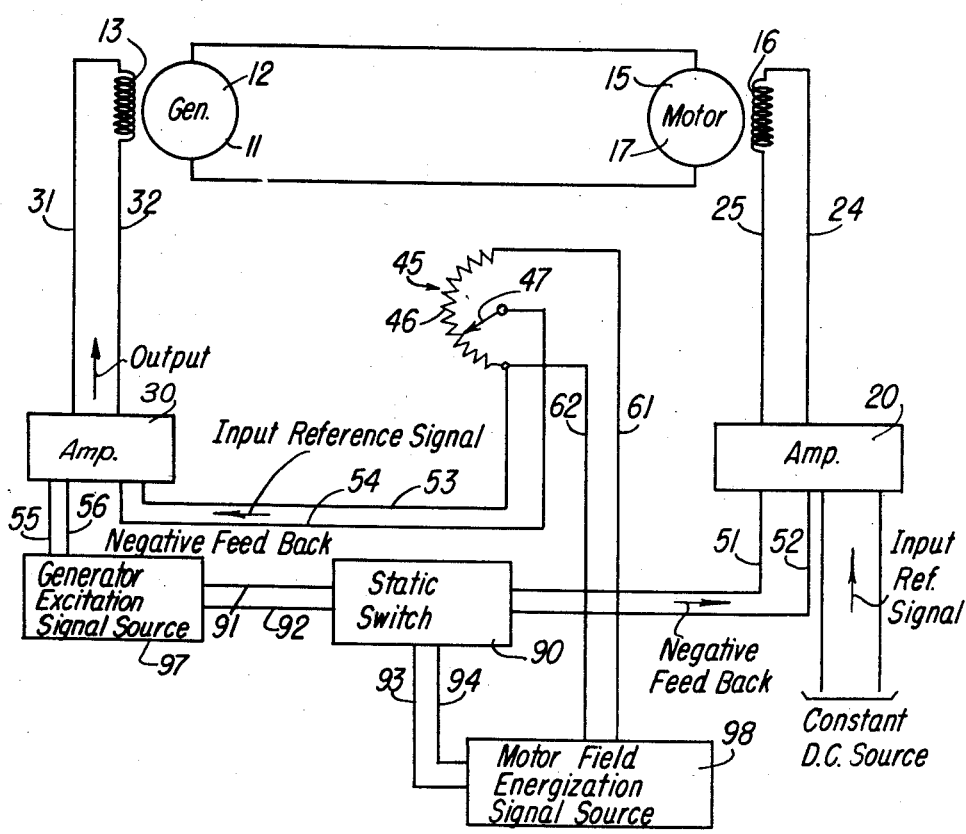

2,929,975
Patented Mar. 22, 1960

United States Patent Office

2,929,975

D.C. ADJUSTABLE SPEED DRIVE

James N. Caldwell, Waukesha, and Hans R. A. Hansen, Milwaukee, Wis., assignors to The Louis Allis Co., Milwaukee, Wis., a corporation of Wisconsin Application May 6, 1959, Serial No. 811,499

12 Claims. (Cl. 318—154)

The present invention relates to a direct current adjustable speed drive system and particularly to a control circuit for effecting a cross-over between the armature voltage speed regulation range and the field voltage speed regulation range of an adjustable speed direct current motor.

This application is a continuation-in-part of applicants' co-pending application, Ser. No. 737,240, filed on May 23, 1958, now abandoned.

An object of the present invention is to provide an improved direct current drive system for machinery and the like that is effective for accurately regulating drive speed over a wide range of operating speeds.

An additional object of the present invention is to provide an improved control circuit arrangement for an adjustable speed direct current drive that effects a smooth and continuous transition between the armature voltage speed regulation range and the field voltage speed regulation range of the D.C. motor.

A further object of the invention is to provide in a generator-motor set a control circuit characterized as furnishing an armature voltage speed regulation range and a motor field speed regulation range wherein the control circuit includes a generator field amplifier of the feedback type and a motor field amplifier of the feedback type, respectively controlling the generator field energization and the motor field energization, a constant reference source for the motor field amplifier, a variable pick-off in the output of the motor field amplifier for providing a selected reference signal to the generator field amplifier, and a static switch for applying a selected negative feedback to the motor field amplifier. Negative feedback to the generator field amplifier is derived from the generator machine and is a substantially linear function of the generator excitation. The static switch has applied thereto a first signal which is a linear function of the generator excitation and a second signal which is a linear function of the motor field energization and the switch operates so as to provide to the negative feedback terminals of the motor field amplifier a signal corresponding to the greater one of the first and second signals applied thereto. In this arrangement, the generator-motor set is energized from the control circuit in accordance with the positioning of the variable pick-off for operating the generator-motor set through an armature voltage speed regulation range and a motor field speed regulation range thereby to accurately control the speed of the motor over a wide speed range band.

A more specific object of the invention is to provide a control circuit for a generator-motor set characterized as being provided with an armature voltage speed regulation range and a motor field speed regulation range, wherein the control circuit includes a generator field amplifier and a motor field amplifier, a source of reference signal for the motor field amplifier, a static switch or cross-over network connected in the output of the motor field amplifier for providing both a feedback control signal to the motor field amplifier and a reference signal to the generator field amplifier. The cross-over network operates in a first phase where the output of the motor field amplifier is maximum and constant and the output of the generator field amplifier is variable, and in a second phase where the output of the generator field amplifier is at a maximum and constant and the output of the motor field amplifier is variable. Negative feedback is provided to the generator field amplifier from the generator for purposes of maintaining the generator armature output and, accordingly, the motor armature input proportional to the energization provided to the generator field amplifier from the cross-over network. By virtue of this arrangement, the speed of the D.C. motor may be accurately controlled over a wide speed range band.

Further objects and features of the invention pertain to the particular structural arrangement whereby the above-identified and other objects of the invention are obtained.

The invention, both as to its structure and manner of operation, will be better understood by reference to the following specification and drawings, forming a part thereof, wherein:

Figure 1 is a schematic representation of a variable speed drive arrangement in accordance with the invention;

Figure 2 is a schematic representation of an alternative drive arrangement in accordance with the invention;

Figure 6 is a generalized block schematic representation of the variable speed drive arrangements shown in Figures 1, 2 and 3.

Figure 3:
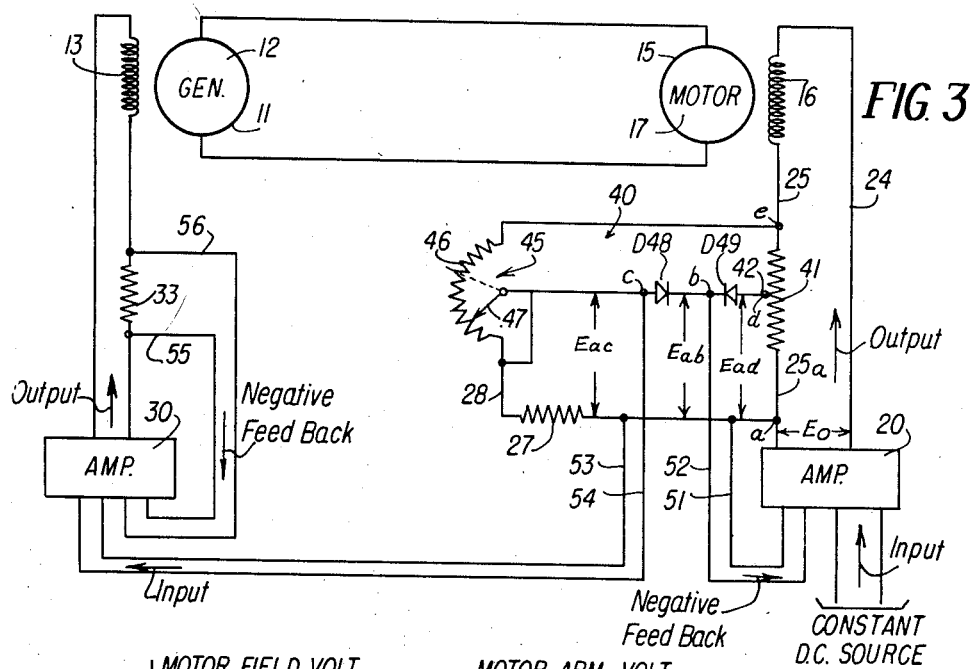
Figure 3 is a schematic representation of a further alternative drive arrangement in accordance with the invention.

Referring now to the drawings, there is shown in Figure 1 a schematic representation of one drive arrangement in accordance with the invention. In the arrangement, there is included a generator-motor set of the Ward-Leonard type including a D.C. generator 11 and a D.C. motor 15. The generator 11 is provided with an armature 12 and the field winding 13 and the D.C. motor 15 is provided with a field winding 16 and an armature 17, the latter of which is connected directly to the armature 12 of the generator 11. Additionally, there is provided a motor field amplifier 20 for energizing the field winding 16 of the motor 15 via conductors 24 and 25, a generator field amplifier 30 for energizing the field winding 13 of the generator 11 via the conductors 31 and 32 and a cross-over network 40 connected in the output of the motor field amplifier 20 for providing a feedback control to the motor field amplifier and for providing a source of reference signal to the generator field amplifier 30.

The cross-over network 40 includes a voltage divider resistance 41 connected in the output of the motor field amplifier 20 in series with the field winding 16, a potentiometer 45 including a linear resistance element 46 and a movable connector arm 47 for which the resistance element 46 is connected in parallel with the voltage divider resistance 41 at the junctions $a$ and $e$. The center tap 42 of the voltage divider resistance 41 is connected to the movable arm 47 of potentiometer 45 through a pair of unidirectional current flow devices D48 and D49 connected in series opposition. The current devices D48 and D49 are connected cathode to cathode at a junction $b$ so as to permit a current flow through D48 from junction $c$ between the anode of D48 and the movable arm 47 or through D49 from junction $d$ between the anode of D49 and tap 42 of resistor 41. A pair of conductors 51 and 52 connected between junctions $a$ and $b$ of the cross-over network 40 extend to the motor field amplifier 20 for purposes of providing negative feedback thereto. A pair of conductors 53 and 54 are connected between junctions $a$ and $c$ of the cross-over network 40 for providing an input signal to the generator field amplifier 30. This orientation of diodes D48 and D49 has been selected in accordance with the manner of current flow in the cross-over circuit. It is understood that if the direction of current flow were reversed in the cross-over circuit the diodes would be connected anode to anode and the circuit would function in the same manner as described.

Additionally, in the arrangement of Figure 1, a reference signal current is provided to the motor field amplifier 20 from a source of constant D.C. current and the generator field amplifier 30 is provided with a negative feedback control extended by means of conductors 55 and 56 connected across the armature 12 of the generator 11.

Considering now the operation of the arrangement shown in Figure 1 and assuming that a constant D.C. voltage E is applied to the reference input of the motor field amplifier, an output voltage $E_o$ appears across the conductors 24 and 25a and is applied to the motor field winding 16 and the voltage divider resistance 41. In the cross-over network 40 a portion of the voltage $E_o$, corresponding to the voltage $E_{ac}$, is found to lie across the resistance 41 and the resistance element 46 of the potentiometer 45. In this arrangement, the voltage $E_{ab}$ is fed back to the amplifier by conductors 51 and 52 in negative feedback arrangement so that the motor field amplifier 20 is regulated so as to maintain the voltage $E_{ab}$ substantially constant.

Another voltage $E_{ac}$ is applied via the conductors 53 and 54 as a reference input to the generator field amplifier 30. The output voltage $E_g$ of the amplifier 30 is applied via conductors 31 and 32 to the generator field winding 13. This voltage is utilized for purposes of energizing the generator 30 as to produce an output voltage $E_m$ across the armature 12 thereof which voltage is applied to the armature 17 of the motor 15. A feedback voltage from the armatures of the generator and motor is applied via the conductors 55 and 56 to the amplifier 30 so that the generator field amplifier will tend to regulate in a manner as to render the voltage $E_m$ proportional with the voltage $E_{ac}$.

In this arrangement, there are two phases of operation dependent upon the position of the movable arm 47 relative to the resistance element 46 in the potentiometer 45. In the first phase, where the voltage $E_{ac}$ is less than the voltage $E_{ad}$, the diode D49 is rendered conductive and the diode D48 is rendered non-conductive so that the voltage $E_{ad}$ becomes substantially constant and equal to $E_{ab}$, which voltage is maintained constant by the regulating of the output of the amplifier 20. The motor field current is maintained constant due to $E_{ad}$ being constant. In the second phase of operation where the voltage $E_{ac}$ is greater than $E_{ad}$, the diode D48 is rendered conductive and the diode D49 is rendered non-conductive so that the voltage $E_{ac}$ becomes substantially constant inasmuch as it is substantially equal to $E_{ab}$ which is maintained constant by the regulating effect of the amplifier 20.

Figure 4:
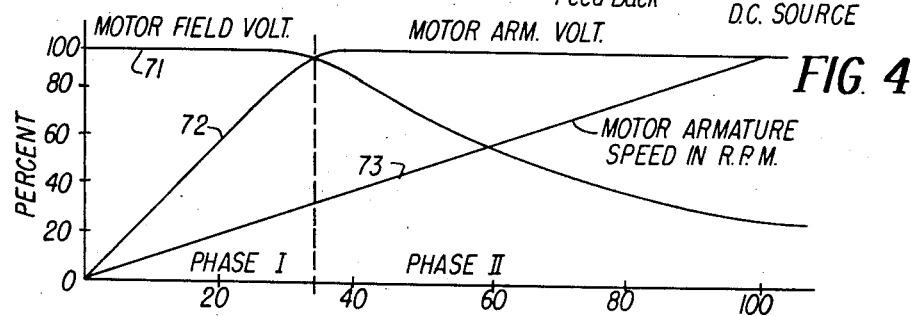
Figure 4 is a chart showing the operational characteristics of a D.C. motor controlled in accordance with the drive arrangements of Figures 1 and 2.

Considering the first phase of operation and assuming that the voltage $E_{ac}$ is zero by virtue of the potentiometer arm 47 being in its extreme counterclockwise direction, no input will be applied to the generator field amplifier 30, there will be no output voltage $E_g$ so that the generator 11 is not energized and the armature voltage $E_m$ will be zero so that the motor 15 is not rotated and the speed thereof is zero. However, as the potentiometer arm 47 is moved in the clockwise direction from this extreme counterclockwise position, the voltage $E_{ac}$ changes linearly so that the voltage $E_g$ and $E_m$ increases correspondingly and the motor 15 begins rotation increasing linearly in speed with the linear change in the voltage $E_{ac}$. This phase I of operation is illustrated in Figure 4 where the curve 71 represents the motor field voltage, the curve 72 represents the motor armature voltage and the curve 73 represents the motor armature speed in revolutions per minute.

As the slider arm 47 of the potentiometer 45 is moved in the clockwise direction and the voltage $E_{ac}$ approaches the voltage $E_{ad}$, a point of cross-over is reached between phase I and phase II of the motor operation. When the voltage $E_{ac}$ becomes larger than the voltage $E_{ad}$, then the diode D48 is rendered conductive and the diode D49 is rendered non-conductive so that the voltage $E_{ab}$ will be equal to the voltage $E_{ac}$. However, as previously set forth, the voltage $E_{ab}$ is maintained constant by the negative feedback applied to the motor field amplifier 20 and accordingly the voltage $E_{ac}$ will become constant.

As the slider arm 47 of the potentiometer 45 is rotated further in the clockwise direction, the voltages $E_{ab}$ and $E_{ac}$ are maintained constant by virtue of the fact that the output voltage $E_o$ of the motor field amplifiers 20 is progressively reduced. Accordingly, the motor field voltage decreases while the motor armature voltage is held constant so that the speed of the motor further increases. Thus the speed of the motor increases until the slider arm 47 of the potentiometer 45 reaches its maximum clockwise position.

According to the foregoing description, the speed of the motor 15 is increased linearly as the position of the slider arm 47 in the potentiometer 45 is moved from its extreme counterclockwise direction to its extreme clockwise direction across the linear resistance element 46 thereof. The speed regulation may be further improved by adding to the circuit some form of IR drop compensation as is well known in the art.

A variation of the drive control system of Figure 1 is shown in Figure 2. Therein, the voltage divider resistance element 41 of the cross-over network 40 is connected in parallel with the field winding 16 of the motor 15 across conductors 24 and 25. The same parallel relationship between the resistance element 46 of the potentiometer 45 and the voltage divider resistance 41 is maintained with the resistance element 46 being connected across the output conductors 24 and 25 of the amplifier 20. Operation of this circuit is substantially the same as that described above with reference to the Figure 1, except that in this case the motor field amplifier is provided with feedback from the field voltage rather than from the field current of the arrangement of Figure 1.

A further variation is shown in the arrangement of Figure 2 in that feedback to the generator field amplifier 30 is provided directly from the output conductors 31 and 32 of the generator field amplifier rather than from the armature of the generator 11. In this arrangement, the feedback is from the generator field voltage.

Figure 5:
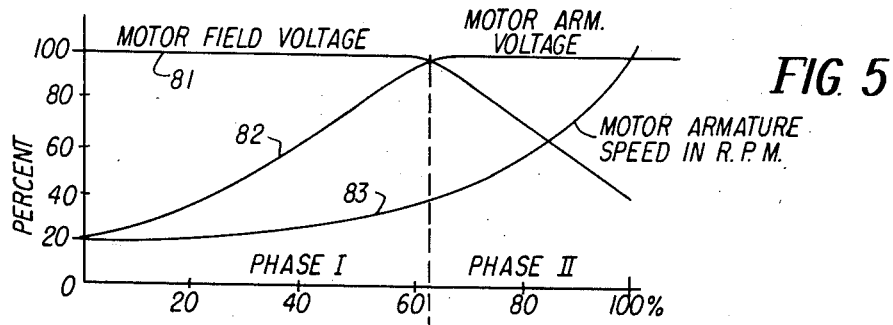
Figure 5 is a chart showing the operational characteristics of a D.C. motor controlled in accordance with the drive arrangement of Figure 3.

An additional variation of the arrangement in accordance with the invention is shown in Figure 3. Therein the cross-over network 40 is connected in the output of the motor field amplifier 20 as shown in Figure 1. However, the cross-over network 40 is modified so that a resistance element 27 is connected in series with the resistance element 46 of the potentiometer 45 across the terminals of the voltage divider resistance element 41. In this instance, the junction 28 between the resistance element 46 and the resistor 27 is connected through the movable arm 47 of the potentiometer 45 so that the voltage $E_{ac}$ varies non-linearly with the linear variations in the resistance tapped by the movable arm 47 of the potentiometer 45. Specifically, the resistance element 46 of the potentiometer 45 is of a linear type, that is, the resistance picked off by the movable arm 47 varies linearly with linear movements of the movable arm 47. However, the voltage across the resistor 27 or the voltage $E_{ac}$ varies hyperbolically with linear variations in the position of the movable arm 47. Accordingly, as the position of the movable arm 47 is varied from an extreme counterclockwise position to the extreme clockwise position, the voltage $E_{ac}$ tends to increase hyperbolically so that the armature voltage increases in a non-linear fashion as shown in Figure 5. In this arrangement, the motor field voltage will change in accordance with the curve shown in 81, the generator armature voltage would change in accordance with the curve 82 and the motor armature speed will change in accordance with curve 83, that is, speed in revolutions per minute will be a hyperbolic function of the linear position of the slider arm 47 in the potentiometer 45. A D.C. motor control in accordance with this arrangement could be used as a constant cutting speed drive for lathes and the like where, in order to maintain a constant surface speed for the piece being cut, it is necessary to hyperbolically increase the rotational speed of the piece as the radius of the piece decreases. The present arrangement could be accommodated for controlling constant surface cutting speed by varying the position of the slider arm 47 of the potentiometer 45 in accordance with the changes in the radius of the piece being cut.

A further variation of the arrangement shown in Figure 3 is that feedback to the generator field amplifier 30 is provided in accordance with the generator field current by means of a resistor 33 connected in series with the field winding 13. This arrangement is alternative to the other feedback arrangements disclosed. The voltage across the resistor 33 is applied through conductors 55 and 56 to the amplifier 30 thereby to provide a negative feedback for regulating the generator field voltage in accordance with the voltage $E_{ac}$ applied thereto.

In view of the foregoing, it is appreciated that there has been provided herein an improved adjustable speed D.C. drive for a Ward-Leonard drive system which facilitates "cross-over" between the armature voltage speed regulation range and the field voltage speed regulation range of the D.C. motor.

The various circuit arrangements of Figures 1 to 3 are generalized in the block schematic diagram shown in Figure 6. This circuit is the same as that of Figures 1 to 3 except that the cross-over network 40 of Figures 1 to 3 is illustrated in its component form as a potentiometer 45 and a static switch 90 and the feedback source to the generator field amplifier 30 is generalized. As in Figures 1 to 3, the potentiometer 45 is utilized as a pick-off for deriving from a source 98 corresponding to motor field energization and via conductors 61 and 62 a selectable signal which is applied to the generator field amplifier 30 as the input reference signal. The static switch 90 corresponds in function to the diode switch including the diodes D48 and D49 of the cross-over network 40 shown in Figures 1 to 3. Specifically, the static switch has applied thereto from a source 97 via conductors 91 and 92 a first signal that is a substantially linear function of generator excitation and from a source 98 via conductors 93 and 94 a second signal that is a linear function of motor field energization. The static switch operates so that the greater of these two signals is applied via the conductors 51 and 52 to the motor field amplifier 20 as a negative feedback control voltage.

Giving consideration to the generator excitation signal source 97, it is appreciated that a measure of generator excitation is the generator armature voltage and that generator excitation is a substantially linear function of generator field voltage, generator field current and speed of armature rotation. In most circumstances, the latter is held constant and control is exercised by varying the generator field voltage or the generator field current. Accordingly, for the usual control circumstance the source 97 may in fact be a parallel tap with the generator armature 12 as shown in Figure 1 furnishing a measure of armature voltage, a parallel tap with the generator field winding 13 as shown in Figure 2 furnishing a measure of generator field voltage, or a series tap with the generator field winding 13 as shown in Figure 3 furnishing a measure of generator field current.

It has been stated that the source 98 furnishes a second signal that is substantially a linear function of motor field energization. Inasmuch as motor field energization is directly proportional to the motor field voltage and directly proportional to the motor field current, the source 98 may in fact be a series tap with the motor field winding 16 as shown in Figures 1 and 3 furnishing a measure of motor field current or a parallel tap with the motor field winding 16 as shown in Figure 2 furnishing a measure of motor field voltage.

As pointed out earlier, the static switch 90 is arranged so that throughout the speed range of phase I operation the feedback signal fed to the motor field amplifier 20 is a function of motor field energization so that the output of amplifier 20 remains constant. However, throughout the speed range of phase II operation the feedback signal fed to the motor field amplifier 20 from the static switch 90 is a function of generator excitation which, in the circumstance of constant armature speed, is determined fundamentally by the input reference signal to the amplifier 30 at conductors 53 and 54. This signal tends to be constant and is tapped from the motor field energization source 98 by means of the potentiometer 45. Motor field energization is held constant in the phase II operation by furnishing a corresponding feedback signal to the amplifier 20 at conductors 51 and 52 which varies the output of the amplifier 20 in accordance with speed potentiometer settings. With the motor field energization held constant, the input reference signal to the amplifier 30 is held constant. The static switch 90, of course, may be the diodic arrangement as set forth in Figures 1, 2 and 3. However, it is not meant to limit the switch to such a configuration and it is understood that a magnetic switch circuit or other electronic switch circuits including vacuum tubes and transistor components could be utilized.

The generator field amplifier 30 is provided with a negative feedback signal from source 97 at conductors 55 and 56. As pointed out above, this generator excitation signal source may be a parallel tap with the generator armature 12, a parallel tap with the generator field winding 13 or it may be a series tap with the generator field winding 13. The feedback signal so produced operates in a manner so as to maintain the output of the generator field amplifier 30 as applied to the generator field winding 13 directly proportional to the input reference signal applied to conductors 53 and 54.

The amplifiers utilized in the arrangements may be either electronic, magnetic or rotating amplidyne or metadyne amplifiers and the diodes D48 and D49 may be of any suitable type such as crystal rectifiers or vacuum tubes. In this sense, it is appreciated that variations and modifications may be made in the arrangement shown herein without departing from the scope of the invention. Accordingly, it is intended to cover in the appended claims all such variations and modifications as fall within the true spirit and scope of the invention.

What is claimed is:

1. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding, a first control amplifier provided with output terminals connected to said motor field winding and input reference terminals and feedback control terminals, a constant reference source connected to said input reference terminals, a second control amplifier provided with output terminals connected to the generator field winding and input reference terminals and feedback control terminals, parallel means disposed in the output of said first amplifier, one of said parallel means providing a fixed portion of the total voltage applied thereto as a first signal voltage, the other of said parallel means providing a selectable portion of the total voltage applied thereto as a second signal voltage, means for applying the greater of said first and second signal voltages to the feedback control terminals of said first amplifier for controlling the output voltage of said first amplifier so as to maintain the greater one of said first and second signal voltages constant, means for applying said second signal voltage to the input reference terminals of said second amplifier, and means for applying to the feedback control terminals of said second amplifier a potential corresponding to the excitation in said generator armature for establishing the generator armature voltage substantially proportional to the second signal voltage input, whereby the speed of said motor is regulated through the armature and the field winding of said motor in accordance with the selected second signal voltage.

2. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding, a first control amplifier provided with output terminals connected to said motor field winding and input reference terminals and feedback control terminals, a constant reference source connected to said input reference terminals, a second control amplifier provided with output terminals connected to the generator field winding and input reference terminals and feedback control terminals, parallel means disposed in the output of said first amplifier, one of said parallel means providing a fixed portion of the total voltage applied thereto as a first signal voltage, the other of said parallel means providing a selectable portion of the total voltage applied thereto as a second signal voltage, means for applying the greater of said first and second signal voltages to the feedback control terminals of said first amplifier in a negative feedback relationship for controlling the output voltage of said first amplifier so as to maintain the greater one of said first and second signal voltages constant, means for applying said second signal voltage to the input reference terminals of said second amplifier, and means for applying a potential corresponding to the excitation in said generator armature to the feedback control terminals of said second amplifier in negative feedback relationship for establishing the generator armature voltage proportional to the escond signal voltage input, whereby the speed of said motor is regulated through the armature and the field winding of said motor in accordance with the selected second signal voltage.

3. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding; a first control amplifier provided with output terminals connected to said motor field winding and input reference terminals and feedback control terminals, a constant voltage source connected to said input reference terminals, a second control amplifier provided with output terminals connected to the generator field winding and input reference terminals and feedback control terminals, a first voltage divider and a second voltage divider connected in parallel and disposed in the output of said first amplifier, said first voltage divider including fixed resistors for providing a fixed portion of the total voltage applied thereto as a first signal voltage, said second voltage divider including a potentiometer for providing a selectable portion of the total voltage applied thereto as a second signal voltage, voltage gating means for applying the greater of said first and second signal voltages to the feedback control terminals of said first amplifier in negative feedback relationship for controlling the output voltage of said first amplifier so as to maintain the greater one of said first and second signal voltages constant, means for applying said second signal voltage to the input reference terminals of said second amplifier, and means for applying a potential corresponding to the excitation in said generator armature to the feedback control terminals of said second amplifier in negative feedback whereby the speed of said motor is regulated through the armature and the field winding of said motor in accordance with the selected second signal voltage.

4. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding; a constant voltage source, a first amplifier for energizing said motor field winding from said constant voltage source, means disposed in the output of said first amplifier for providing a fixed portion of the voltage applied thereto as a first signal voltage and providing a selectable portion of the voltage applied thereto as a second signal voltage, means for utilizing the greater of said first and second signal voltages to control the output of said first amplifier so as to maintain the greater one of said first and second signal voltages constant, a second amplifier for energizing said generator field winding from said second signal voltage, and means for controlling said second amplifier in accordance with the excitation of said generator armature in order to establish the generator armature voltage proportional to said second signal voltage, whereby the speed of said motor is regulated through the armature and the field winding of said motor in accordance with the selected second signal voltage.

5. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding; a first control amplifier provided with output terminals connected to said motor field winding and input reference terminals and feedback control terminals, a constant voltage source connected to said input terminals, a second control amplifier provided with output terminals connected to the generator field winding and input reference terminals and feedback control terminals, a first voltage divider and a second voltage divider connected in parallel and disposed in the output of said first amplifier in series with the motor field winding, said first voltage divider including fixed resistors for providing a fixed portion of the total voltage applied thereto as a first signal voltage, said second voltage divider including a potentiometer for providing a selectable portion of the total voltage applied thereto as a second signal voltage, voltage gating means for applying the greater of said first and second signal voltages to the feedback control terminals of said first amplifier in negative feedback relationship for controlling the output voltage of said first amplifier so as to maintain the greater one of said first and second signal voltages constant, means for applying said second signal voltage to the input reference terminals of said second amplifier, and means for applying a potential corresponding to the excitation in said generator armature to the feedback control terminals of said second amplifier in negative feedback relationship for establishing the generator armature voltage proportional to the second signal voltage input, whereby the speed of said motor is regulated through the armature and the field winding of said motor in accordance with the selected second signal voltage.

6. In a motor generator drive arrangement including a D.-C. motor the speed of which is to be controlled in accordance with excitation provided by the armature and the field winding thereof and including a generator for controlling the motor armature voltage in accordance with the excitation provided to the generator armature by the generator field winding; a first control amplifier provided with output terminals connected to said motor field winding and input reference terminals and feedback control terminals, a constant voltage source connected to said input reference terminals, a second control amplifier provided with output terminals connected to the generator field winding and input reference terminals and feedback control terminals, a first voltage divider and a second voltage divider connected in parallel and disposed in the output of said first amplifier in parallel with the motor field winding, said first voltage divider including fixed resistors for providing a fixed portion of the total voltage applied thereto as a first signal voltage, said second voltage divider including a potentiometer for providing a selectable portion of the total voltage applied thereto as a second signal voltage, voltage gating means for applying the greater of said first and second signal voltages to the feedback control terminals of said first amplifier in negative feedback relationship for controlling the output voltage of said first amplifier so as to maintain the greater one of said first and second signal voltages constant, means for applying said second signal voltage to the input reference terminals of said second amplifier, and means for applying a potential corresponding to the excitation in said generator armature to the feedback control terminals of said second amplifier in negative feedback relationship for establishing the generator armature voltage proportional to the second signal voltage input, whereby the speed of said motor is regulated through the armature and the field winding of said motor in accordance with the selected second signal voltage.

7. In a motor generator drive arrangement including a D.-C. motor the speed of which is to be controlled in accordance with excitation provided by the armature and the field winding thereof and including a generator for controlling the motor armature voltage in accordance with the excitation provided to the generator armature by the generator field winding; a first control amplifier provided with output terminals connected to said motor field winding and input reference terminals and feedback control terminals, a constant voltage source connected to said input reference terminals, a second control amplifier provided with output terminals connected to the generator field winding and input reference terminals and feedback control terminals, a first voltage divider and a second voltage divider connected in parallel and disposed in the output of said first amplifier, said first voltage divider including fixed resistors for providing a fixed portion of the total voltage applied thereto as a first signal voltage, said second voltage divider including a potentiometer for providing a selectable portion of the total voltage applied thereto as a second signal voltage, voltage gating means for applying the greater of said first and second signal voltages to the feedback control terminals of said first amplifier in negative feedback relationship so as to maintain the greater of said first and second signal voltages constant, means for applying said second signal voltage to the input reference terminals of said second amplifier, and means disposed in the output of said second amplifier for applying a negative feedback voltage to the feedback control terminals of said second amplifier in order to establish the generator armature voltage substantially proportional to said second signal voltage, whereby the speed of said motor is regulated through the armature and the field winding of said motor in accordance with the selected second signal voltage.

8. In a motor generator drive arrangement including a D.-C. motor the speed of which is to be controlled in accordance with excitation provided by the armature and the field winding thereof and including a generator for controlling the motor armature voltage in accordance with the excitation provided to the generator armature by the generator field winding; a first control amplifier provided with output terminals connected to said motor field winding and input reference terminals and feedback control terminals, a constant voltage source connected to said input reference terminals, a second control amplifier provided with output terminals connected to the generator field winding and input reference terminals and feedback control terminals, a first voltage divider and a second voltage divider connected in parallel and disposed in the output of said first amplifier, said first voltage divider including fixed resistors for providing a fixed portion of the total voltage applied thereto as a first signal voltage, said second voltage divider consisting of a linear potentiometer for providing at its center tap a selectable portion of the voltage applied to the resistor thereof as a second signal voltage, voltage gating means for applying the greater of said first and second signal voltages to the feedback control terminals of said first amplifier in negative feedback relationship so as to maintain the greater of said first and second signal voltages constant, means for applying said second signal voltage to the input reference terminals of said second amplifier, and means disposed in the output of said generator armature for applying a negative feedback voltage to the feedback control terminals of said second amplifier in order to establish the generator armature voltage substantially proportional to said second signal voltage, whereby the speed of said motor is regulated through the armature and the field winding of said motor to vary substantially linearly with said selectable second signal voltage.

9. In a motor generator drive arrangement including a D.-C. motor the speed of which is to be controlled in accordance with excitation provided by the armature and the field winding thereof and including a generator for controlling the motor armature voltage in accordance with the excitation provided to the generator armature by the generator field winding; a first control amplifier provided with output terminals connected to said motor field winding and input reference terminals and feedback control terminals, a constant voltage source connected to said input reference terminals, a second control amplifier provided with output terminals connected to the generator field winding and input reference terminals and feedback control terminals, a first voltage divider and a second voltage divider connected in parallel and disposed in the output of said first amplifier, said first voltage divider including fixed resistors for providing a fixed portion of the total voltage applied thereto as a first signal voltage, said second voltage divider consisting of a resistor connected in series with the linear resistance element of a potentiometer wherein the movable arm of said potentiometer is connected to the series resistance junction and provides a selectable portion of the total voltage applied to the second voltage divider as a second signal voltage, voltage gating means for applying the greater of said first and second signal voltages to the feedback control terminals of said first amplifier in negative feedback relationship so as to maintain the greater of said first and second signal voltages constant, means for applying said second signal voltage to the input reference terminals of said second amplifier, and means disposed in the output of said generator armature for applying a negative feedback voltage to the feedback control terminals of said second amplifier in order to establish the generator armature voltage proportional to said second signal voltage, whereby the speed of said motor is regulated through the armature and the field winding of said motor to vary substantially hyperbolically with linear changes in the position of the movable arm of said potentiometer.

10. In a motor generator drive arrangement including a D.C. motor the speed of which is to be controlled in accordance with excitation provided by the armature and the field winding thereof and including a generator for controlling the motor armature voltage in accordance with the excitation provided in the generator armature by the generator field winding; a control source providing a constant reference signal, a first amplifier for energizing said motor field winding from said constant reference signal, means providing a selectable portion of the motor field energization as a primary control signal, a second amplifier for energizing said generator field winding in accordance with said primary control signal, means providing a secondary control signal corresponding to generator excitation, means providing a tertiary control signal corresponding to motor field energization, switch means for applying the greater of said secondary and tertiary control signals to said first amplifier as a directive signal in order to control the output of said first amplifier and the motor field energization for maintaining the greater of said secondary and tertiary control signals substantially constant, and means for applying said secondary control signal to said second amplifier as a directive signal in order to control the output of said second amplifier for maintaining said generator field energization and said generator excitation in accordance with said primary control signal.

11. In a motor generator drive arrangement including a D.C. motor the speed of which is to be controlled in accordance with excitation provided by the armature and the field winding thereof and including a generator for controlling the motor armature voltage in accordance with the excitation provided in the generator armature by the generator field winding; a control source providing a constant reference signal, a first amplifier for energizing said motor field winding from said constant reference signal, a potentiometer first means connected to said potentiometer and providing a selectable portion of the motor field energization as a primary control signal, a second amplifier for energizing said generator field winding in accordance with said primary control signal, second means providing a secondary control signal that is a substantially linear function of generator excitation, said first means also providing a tertiary control signal that is a substantially linear function of motor field energization, switch means for applying the greater of said secondary and tertiary control signals to said first amplifier as a negative feedback signal in order to control the output of said first amplifier and the motor field energization for maintaining the greater of said secondary and tertiary control signals substantially constant, and means for applying said secondary control signal to said second amplifier as a negative feedback signal in order to control the output of said second amplifier for maintaining said generator field energization and said generator excitation a substantially constant function of said primary control signal.

12. The combination set forth in claim 11 wherein the speed of said generator armature is maintained substantially constant and wherein said switch means is of the static type.

No references cited.